United States Patent [19]
Ruigrok et al.

[11] Patent Number: 5,644,706
[45] Date of Patent: Jul. 1, 1997

[54] FAILURE DETECTION AND REPORTING FOR A COMPUTER MAIL GATEWAY

[75] Inventors: Adrian Ruigrok, Vancouver; Geoffrey G. Kratz, Calgary, both of Canada; Andrew John Wallace, Bellevue; Neil Karl Koorland, Redmond, both of Wash.; James Ross, Vancouver, Canada; Safa Alikashani, North Vancouver, Canada; Marcel Laforce, Surrey, Canada

[73] Assignee: Microsoft Corporation, Redmond, Wash.

[21] Appl. No.: 641,412

[22] Filed: Apr. 30, 1996

Related U.S. Application Data

[63] Continuation of Ser. No. 263,653, Jun. 20, 1994, abandoned.

[51] Int. Cl.$^6$ .................................................. G06F 11/00
[52] U.S. Cl. ................ 395/185.01; 370/242; 395/200.15; 364/241.7
[58] Field of Search ................ 395/185.01, 183.07, 395/183.15, 183.22; 371/8.2, 11.2, 20.1, 34, 35; 364/241.7; 370/28, 32, 85.13

[56] References Cited

U.S. PATENT DOCUMENTS

| | | | |
|---|---|---|---|
| 4,506,111 | 3/1985 | Takenouchi et al. | 179/2 A |
| 4,815,128 | 3/1989 | Malek | 380/9 |
| 4,847,837 | 7/1989 | Morales et al. | 371/8.1 |
| 5,060,228 | 10/1991 | Tsutsui et al. | 370/85.13 |
| 5,109,486 | 4/1992 | Seymour | 395/200 |
| 5,138,615 | 8/1992 | Lamport et al. | 370/94.3 |
| 5,195,126 | 3/1993 | Carrier et al. | 379/45 |
| 5,278,984 | 1/1994 | Batchelor | 395/650 |
| 5,280,474 | 1/1994 | Nickolls et al. | 370/60 |
| 5,331,636 | 7/1994 | Yang et al. | 370/85.14 |
| 5,347,450 | 9/1994 | Nugent | 395/200 |
| 5,347,646 | 9/1994 | Hirosawa et al. | 395/575 |
| 5,353,412 | 10/1994 | Douglas et al. | 395/325 |
| 5,390,298 | 2/1995 | Kuszmaul et al. | 395/200 |
| 5,473,599 | 12/1995 | Li et al. | 370/16 |
| 5,530,809 | 6/1996 | Douglas et al. | 395/200.2 |

Primary Examiner—Robert W. Beusoliel, Jr.
Assistant Examiner—Dieu-Minh Le
Attorney, Agent, or Firm—Seed and Berry LLP

[57] ABSTRACT

Failure detection and reporting for a computer mail gateway is provided. In a preferred embodiment, two computer mail systems are connected by a gateway. The gateway includes an automatic gateway failure detection and reporting facility. The gateway also includes a message transfer store. The facility transmits a message from the first mail system into the message transfer store for retrieval by the second mail system. The facility then detects that the transmitted message from the first mail system has remained in the message transfer store for at least a predetermined time without being retrieved by the second mail system. In response to detecting that the transmitted message from the first mail system has remained in the message transfer store for at least a predetermined time without being retrieved by the second mail system, the facility diagnoses the failure of the gateway. In a further preferred embodiment, after diagnosing the failure of the gateway, the facility provides an indication that the gateway has failed to a user of the first mail system that can remediate the gateway failure. In a further preferred embodiment, the facility transmits test messages into the message transfer store to assist in detecting the failure of the gateway when no normal message traffic is traveling through the gateway.

25 Claims, 6 Drawing Sheets

FAILURE DETECTION AND REPORTING FOR A COMPUTER MAIL GATEWAY

CROSS-REFERENCE TO RELATED APPLICATION

This application is a continuation of U.S. patent application Ser. No. 08/263,653, filed Jun. 20,1994, now abandoned.

TECHNICAL FIELD

The invention relates generally to a method and system for diagnosing errors in a computer mail system, and, more specifically, to failure detection and reporting for a computer mail gateway.

BACKGROUND OF THE INVENTION

In a computer mail system, also known as an electronic mail system, a user may send messages to other users. Messages contain text or data in other forms. Messages sent within a computer mail system are typically transported by a computer network.

In order to enable the exchange of mail between a larger number of users, two computer mail systems may be connected by a "gateway." A gateway is a combination of hardware and software that routes messages between the two mail systems that it connects, thereby permitting users of either of the computer mail systems to send messages to users of the other computer mail system. Gateways further provide protocol, name and address translation services. Gateways may also enforce security restrictions that limit the addresses from which a routed message may be sent or at which a message may be received.

Figure 1:
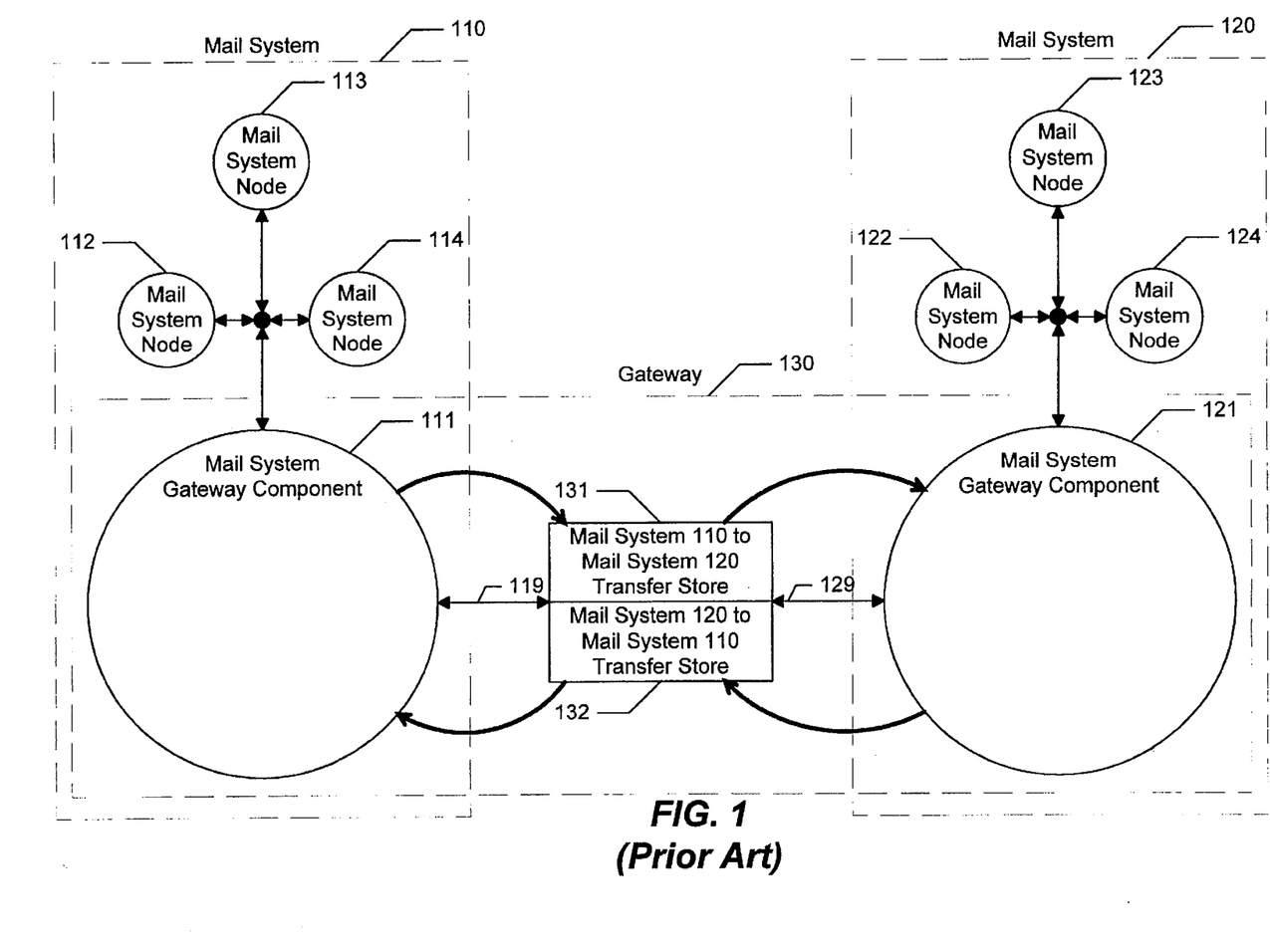
FIG. 1 is a network architectural overview diagram showing two conventional mail systems connected by a gateway.

FIG. 1 is a network architectural overview diagram showing two mail systems connected by a gateway. The diagram shows mail system 110 connected to mail system 120 by a gateway 130. Mail system 110 includes four connected nodes, nodes 111, 112, 113, and 114. A node is a location in a mail system that may send or receive messages. Nodes of the mail system correspond to nodes of a computer network used to transport messages within the mail system. Messages may be sent within mail system 110 from any node to any other node. Mail system 120 similarly includes four connected nodes, nodes 121, 122, 123, and 124, between which messages may be sent. Besides being nodes of their respective mail systems, nodes 11 1 and 121 are also components of the gateway 130. Both gateway components are connected to common message stores, permitting them to exchange messages. The mail system 110 gateway component 111 receives messages sent from any of the mail system 110 nodes and addressed to any of the mail system 120 nodes. Such messages are known as mail system 110 to mail system 120 messages, or "ms110/ms120 messages" for short. The mail system 110 gateway component 111 transmits ms 11O/ms 120 messages via a communications link 119 to a transfer store 131 for ms110/ms120 messages. The ms 11O/ms 120 message transfer store 131 is therefore said to be the outgoing message store of the mail system 110 gateway component 111. The mail system 120 gateway component 121 retrieves ms 11O/ms 120 messages from the ms 11O/ms 120 transfer store 131 via a communication link 129, and transmits each to the mail system 120 node to which it is addressed. The ms110/ms120 message transfer store is therefore said to be the incoming message store of the mail system 120 gateway component 121. In the same way, the mail system 120 gateway component 121 stores messages sent from any of the mail system 120 nodes and addressed to any of the mail system 110 nodes ("20/ms110 messages") in a transfer store 132 for ms120/msl10 messages via communications link 129. The messages stored in transfer store 132 are then retrieved and transmitted to the mail system 110 nodes to which they are addressed via communications link 119 by the mail system 110 gateway component 111. Gateways may also provide additional services, such as translating messages from a format native to one mail system to a format native to another mail system.

Figure 2:
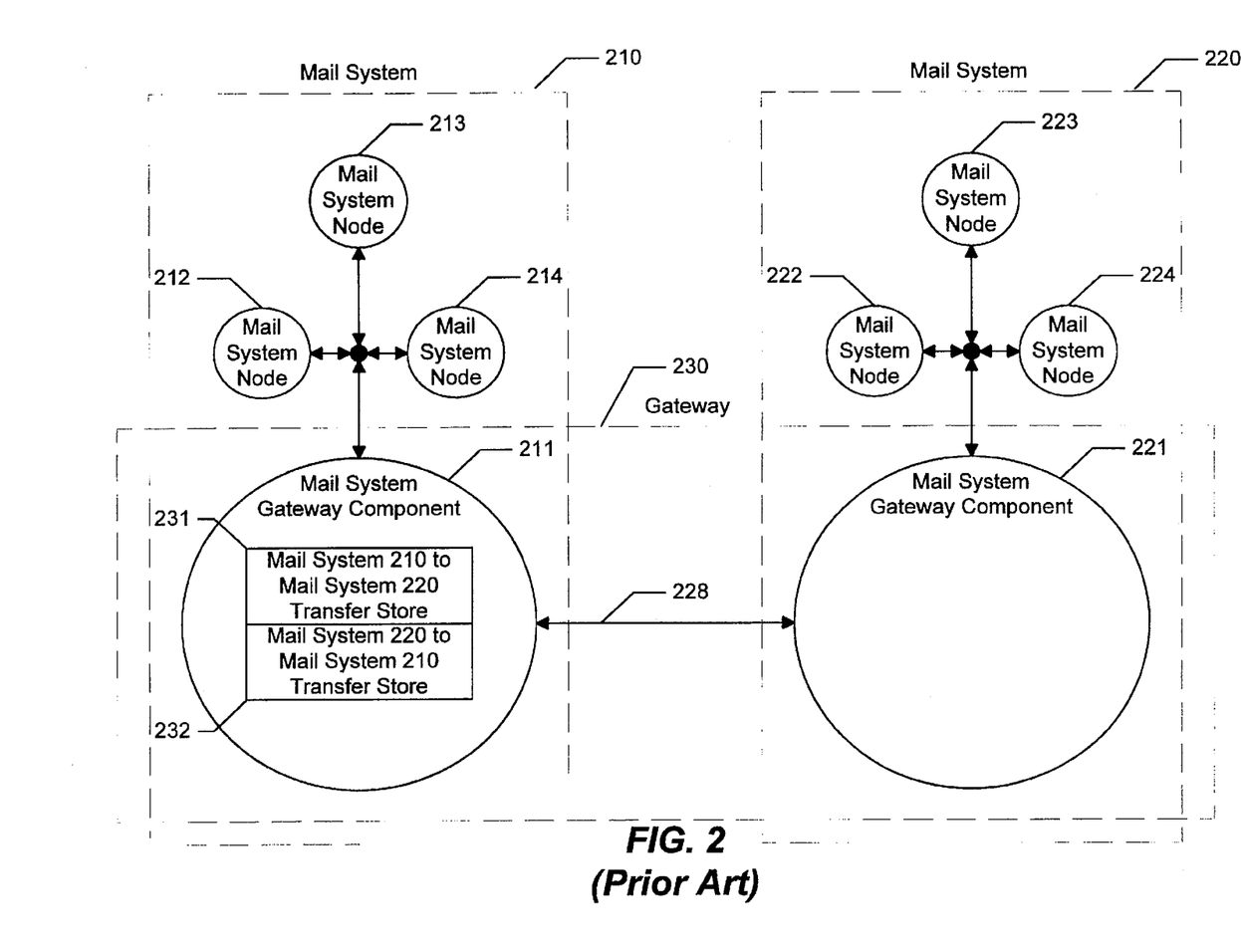
FIG. 2 is a network architectural overview diagram showing a common alternative conventional gateway implementation.

FIG. 2 is a network architectural overview diagram showing a common alternative gateway implementation. Many network configurations permit stores located in one gateway component to be accessed by both gateway components, eliminating the need for a separate node between the mail systems to hold the stores. The diagram shows transfer stores 231 and 232 within the mail system 110 gateway component. In such an implementation, the mail system 110 gateway component is able to directly access the mail stores, while the mail system 120 gateway component accesses the mail stores via its connection 228 to the mail system 110 gateway component.

Even under the best of conditions, gateway components of the types shown in FIGS. 1 and 2, as well as others, are subject to failure. For example, a gateway component node may lose power, or experience an unrecoverable software crash. Further, the connection or connections between the gateway components may be disrupted, either by a physical failure of the connection or by an error condition of the connection. In these failure situations, the gateway ceases to perform its function, preventing any further exchange of messages between the mail systems connected by the gateway. In a typical gateway installation, few people have the expertise needed to remediate gateway failure. For example, at some installations, only a gateway administrator, responsible for maintaining the gateway, or a mail system administrator, responsible for maintaining one or more of the connected mail systems, have the necessary expertise.

However, gateway failure is usually first detected by a user of one of the mail systems who sends a message to a node of the connected mail system, then discovers by communicating with the intended recipient of the message using a mode of communication other than computer mail that much more than the average delivery time has elapsed without the delivery of the message. The user then must contact a gateway or mail system administrator in order to notify the administrator of the failure in order for the failure to be remediated. As computer mail becomes an increasingly prevalent communication medium, several important disadvantages of user detection of gateway failure become apparent. First, it is time consuming for a user to take responsibility to monitor the progress of the messages that he or she sends. Second, users that frequently detect gateway failure may lose confidence in computer mail as a reliable communication medium. Third, failure remediation is limited by the length of time it takes for a user to notice the nondelivery of an inter-mail system message, which can be considerable. As the time interval between failure and failure remediation grows, so does the number of inter-mail system messages whose delivery is delayed. Additionally, as additional delayed inter-mail system messages accumulate, the length of time required for the gateway to exchange the accumulated delayed messages following remediation increases. Fourth, failure remediation is also limited by the availability of users to send and monitor inter-mail system messages. For instance, users may not be available to perform this function late at night or on weekends and holidays.

SUMMARY OF THE INVENTION

It is an object of the invention to provide a method and system in a computer system for detecting the failure of a computer mail gateway.

It is another object of the invention to provide a method and system in a computer system for detecting and reporting the failure of a component of a computer mail gateway.

It is a further object of the invention to provide a method and system in a computer system for using testing messages to detect the failure of a computer mail gateway.

These and other objects, which will become apparent as the invention is more fully described below, are provided by a method and system for computer mail gateway failure detection and reporting. In a preferred embodiment, two computer mail systems are connected by a gateway. The gateway may either be incorporated in one of the mail systems or outside of both of the mail systems. The gateway includes an automatic gateway failure detection and reporting facility. The facility transmits a message from the first mail system into the gateway for retrieval by the second mail system. The facility then detects that the transmitted message from the first mail system has remained in the gateway for at least a predetermined time without being retrieved by the second mail system. In response to detecting that the transmitted message from the first mail system has remained in the gateway for at least a predetermined time without being retrieved by the second mail system, the facility diagnoses the failure of the gateway. In a further preferred embodiment, after diagnosing the failure of the gateway, the facility provides an indication that the gateway has failed to a user of the first mail system that can remediate the gateway failure. In a further preferred embodiment, the facility transmits test messages into the gateway to assist in detecting the failure of the gateway when no normal message traffic is traveling through the gateway.

DETAILED DESCRIPTION OF THE INVENTION

Failure detection and reporting for a computer mail gateway are provided. In a preferred embodiment, a computer mail gateway connecting two computer mail systems is comprised of two connected gateway components (one for each mail system) and two message transfer stores, much like shown in either FIG. 1 or FIG. 2, which are described in detail above. According to the invention, each gateway component preferably contains an instance of a software facility (the facility) for detecting and reporting the failure of the gateway by tracking the amount of time that messages remain in the message transfer stores. The facility permits the gateway to automatically diagnose its own failure, without requiring the intervention of a human user. Methods for designing gateways are well known in the art of computer communications. For example, see E. Mier, "A Product Guide to E-Mail Gateways," *Communications Week*, pp. 58–71, Apr. 18, 1994.

With respect to an instance of the facility, the gateway component containing the instance of the facility is the "originating gateway component." The mail system containing the originating gateway component is the "originating mail system." Correspondingly, the gateway component to which the originating gateway component sends messages is the "receiving gateway component," and the mail system containing the receiving gateway component is the "receiving mail system." In order for the originating gateway component to transfer messages sent from a node of its mail system to a node of the receiving mail system, the originating gateway component stores the message in its outgoing message transfer store. In order for the receiving gateway component to transfer these messages to its own mail system, the receiving gateway component retrieves the messages from the same message transfer store, which is its incoming message transfer store, and then forwards them to the nodes of the receiving mail system to which they are addressed.

When the receiving gateway component ceases to operate in the way described above, the receiving gateway component is said to fail. When a gateway component fails, messages can no longer be exchanged between the mail systems 110 and 120. Gateway component failure therefore causes gateway failure. The facility detects gateway failure by detecting the failure of the receiving gateway component. Because the facility is preferably implemented on each of the connected gateway components (making them each the originating gateway component with respect to their instance of the facility), the facility is able to detect the failure of either of the gateway components.

Specifically, the facility detects the failure of the mail system by tracking the time elapsed between the time at which the originating mail system stores a group of outgoing messages in its outgoing message transfer store and the time at which the receiving mail system retrieves the group of messages from the message store. If this message retrieval time exceeds a configurable maximum message retrieval time, the facility concludes that the receiving gateway component has failed. The facility then reports that the receiving gateway component has failed by generating and transmitting a failure report message to a special user of the originating mail system, such as a gateway administrator or a mail system administrator. Further, in order to guarantee a minimum level of message traffic from the originating gateway component to the receiving gateway component necessary to detect the failure of the receiving gateway component, the facility preferably periodically transmits special messages, called "test messages" or "dummy messages," from the originating gateway component to the receiving gateway component. Transmitting test messages permits the originating gateway to continuously test for the failure of the receiving gateway, even if no normal messages are moving from the originating gateway component to the receiving gateway component.

Figure 3:
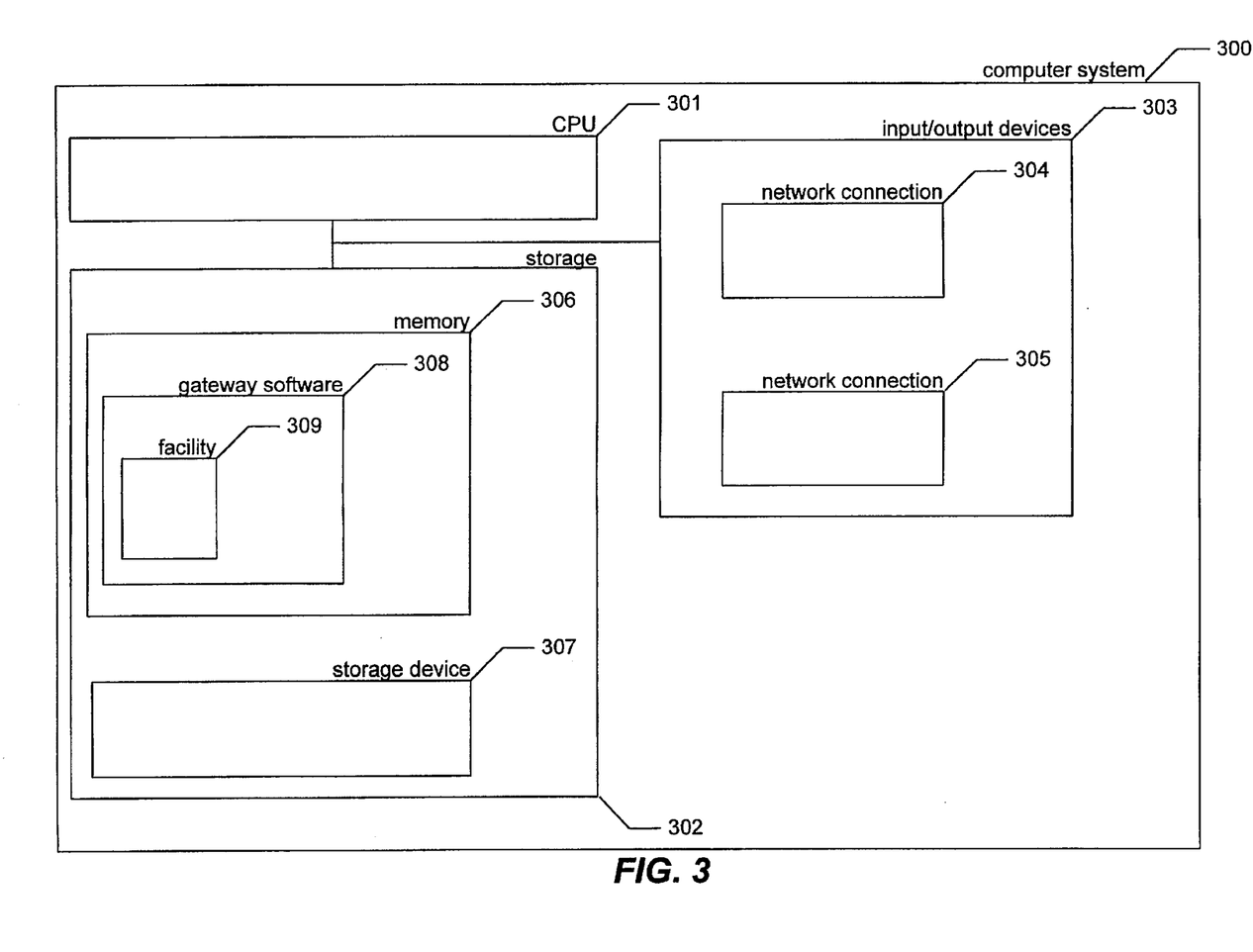
FIG. 3 is a high-level block diagram of the general-purpose computer system that preferably comprises the gateway component upon which the facility of the preferred embodiment of the present invention operates.

FIG. 3 is a high-level block diagram of the general-purpose computer system that preferably comprises the gateway component upon which the facility operates. The computer system 300 contains a central processing unit (CPU) 301, storage 302, and input/output devices 303. Among the input/output devices 303 are two network connections 304 and 305. One network connection provides access to the network for the originating mail system, e.g., nodes 112, 113 and 114, while the other network connection provides access to the message transfer stores, e.g., message transfer stores 131 and 132. The storage 302 includes a computer memory (memory) 306 and a secondary storage device 307, such as a hard disk drive. The memory 306 contains software for controlling the gateway component (gateway software)308. The facility 309 is preferably incorporated in the gateway software 308.

Figure 4:
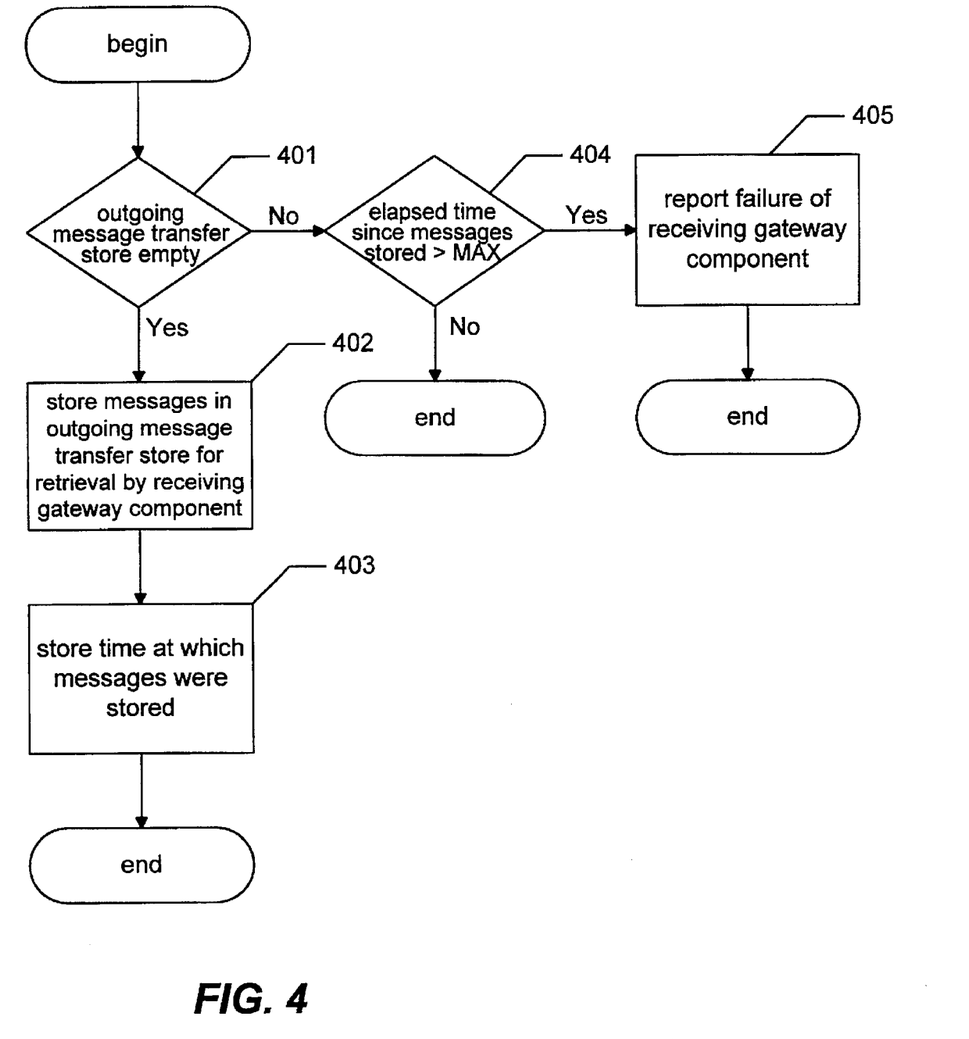
FIG. 4 is a flow diagram showing the steps performed by the facility of the preferred embodiment in order to transmit messages from the originating mail system to the receiving mail system.

FIG. 4 is a flow diagram showing the steps performed by the facility 309 in order to cause the gateway software 308 to transmit messages from the originating mail system to the receiving mail system. In order to reduce the transactional costs incurred when transmitting messages through any gateway, messages are usually transmitted from the originating mail system to the receiving mail system in "batches." That is, in each configured batch collection interval the originating gateway component transmits all messages accumulated from originating mail system nodes during this period to the receiving mail system in a batch. This approach eliminates the need for the originating gateway component to monitor for the arrival of outgoing messages from originating mail system nodes. In such a gateway configuration, the steps shown in FIG. 4 are performed for each batch of messages transmitted. Other configurations, such as one in which each message is transmitted individually as soon as it is received by the originating gateway component from the originating mail system, are also possible and intended to be encompassed within the present invention.

In step 401, the facility determines whether the outgoing message transfer store for the originating gateway component is empty. If the originating outgoing message transfer store is empty, then the receiving gateway component has retrieved all of the messages stored in the originating outgoing message transfer store by the originating gateway component and has not failed, and the facility continues at step 402. In step 402, the facility stores the current batch of outgoing messages in the originating outgoing message transfer store. In step 403, the facility stores the time at which the outgoing messages were stored in the originating outgoing message transfer store in step 402. The facility preferably obtains the time stored in step 403 from a system clock (not shown). In a preferred embodiment, the time stored in step 403 is stored in a timestamp for a file stored in the outgoing message store containing the last batch of outgoing messages.

If, in step 401, the originating outgoing message transfer store is not empty, then the receiving gateway component has not finished retrieving the last batch of messages stored in the originating outgoing message transfer store and may have failed, and the facility continues at step 404. In step 404, if the time that has elapsed since the originating gateway component stored its last batch of messages in the originating outgoing message transfer store (stored the last time the facility performed step 403) exceeds a maximum message retrieval time (MAX), then the facility continues at step 405, else these steps conclude, to be repeated by the facility after a retry period has elapsed. In step 405, the facility reports that the receiving component, and therefore the gateway, has failed. Step 405 preferably involves generating and transmitting a failure report message to a special user of the originating mail system, such as a gateway administrator or a mail system administrator. Step 405 may also involve adding an entry describing the failure in an event log containing information on events that occur in conjunction with the gateway. Such an event log is preferably stored in the secondary storage device 304, and preferably contains, for each logged event, indications of the time the event occurred and of the nature of the event.

Figure 5:
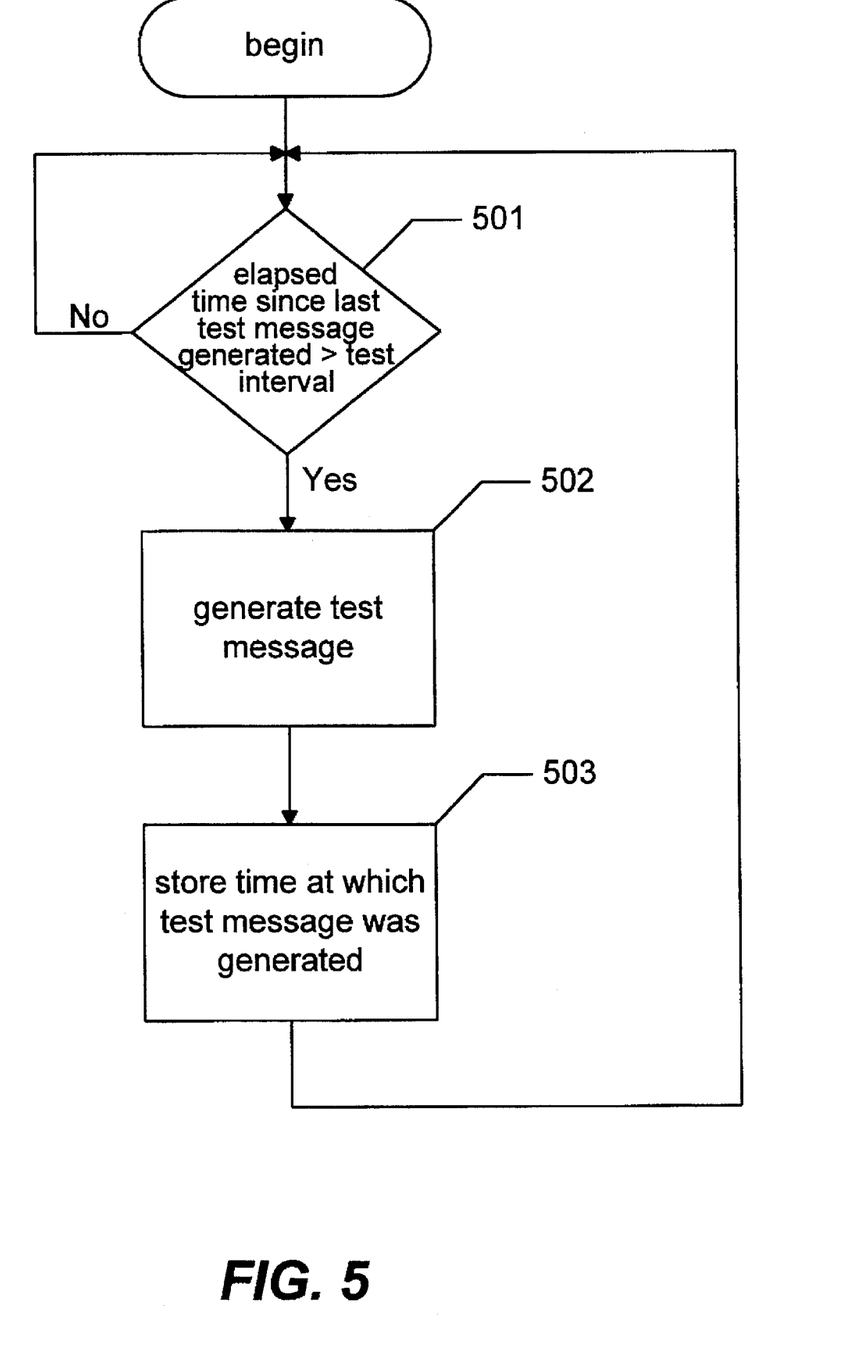
FIG. 5 is a flow diagram showing the steps performed by the facility of the preferred embodiment in order to periodically generate test messages.

Because it is necessary for the originating gateway component to regularly store outgoing message bundles in the originating outgoing message transfer store in order to detect the failure of the receiving gateway component, the facility preferably periodically generates "test messages" or "dummy messages" which are incorporated in an outgoing message bundle by the originating gateway component. FIG. 5 is a flow diagram showing the steps performed by the facility in order to periodically generate test messages for transmission by the gateway software 308. These steps preferably execute continuously on the originating gateway component. In step 501, if the time elapsed since the last test message was generated (the last time the facility performed step 503, described below) exceeds a configurable test interval, then the facility continues at step 502, else the facility continues at step 501. Because the steps shown in FIG. 4 are able to detect gateway failure each time the maximum message retrieval time elapses, so long as there are one or more outgoing messages to constitute a bundle, the test interval is preferably no longer than the maximum message retrieval time. In step 502, the facility generates a test message. In a further preferred embodiment, the facility only generates a test message in step 502 when no outgoing messages are present at the originating gateway component. The facility preferably generates each test message such that it can easily be identified as a test message by the receiving mail system. For example, test messages may all bear a particular message type, all contain an unusual string of text unlikely to be found in an actual message, or all be addressed to a special artificial user of the receiving mail system that exists exclusively to receive (and optionally discard) test messages. In step 503, the facility stores the time at which the test message was generated in step 502. The stored test message time may then be used in step 501 to determine how long it has been since the last test message was generated. After step 503, the facility continues at step 501 to wait until it is time to generate another test message.

Figure 6:
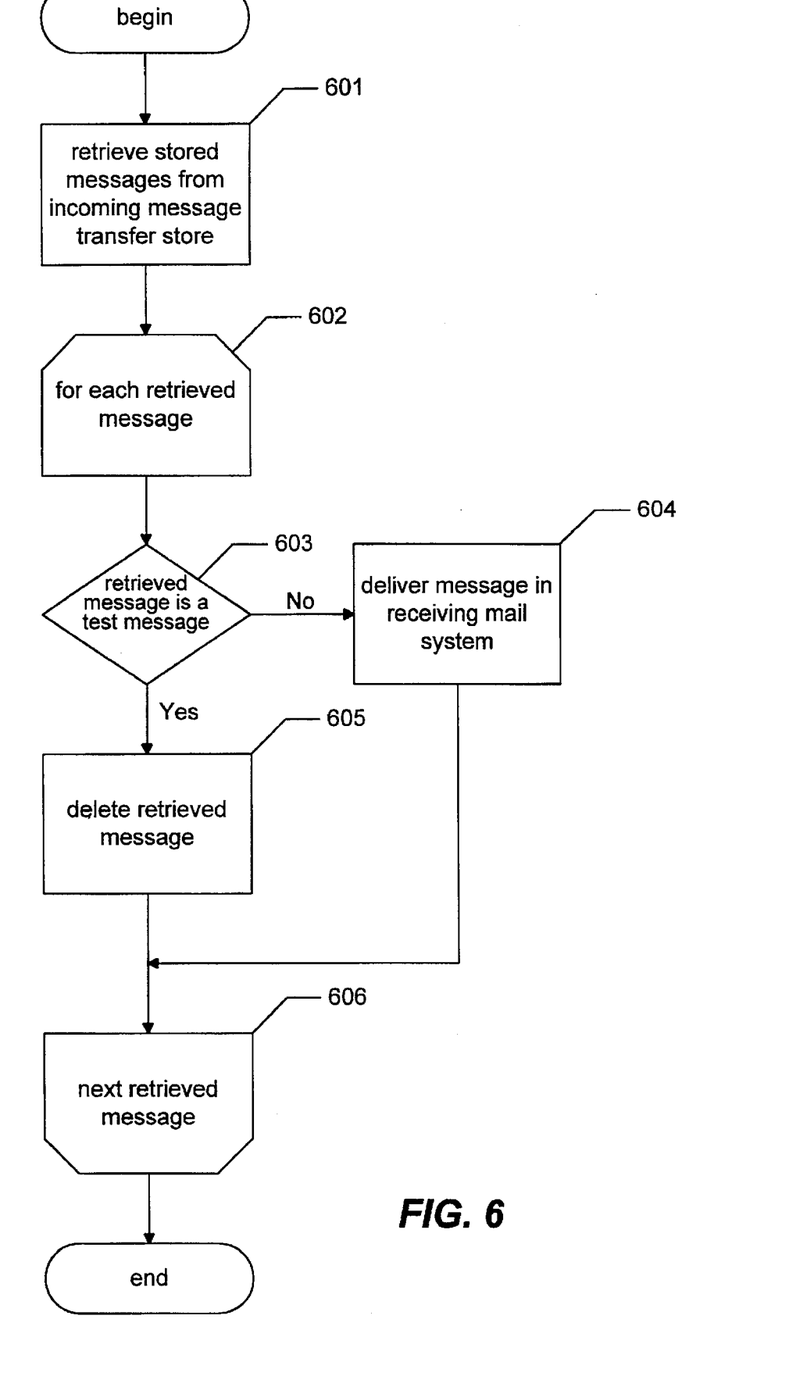
FIG. 6 shows the steps performed by the facility of the preferred embodiment in order to prevent the receiving mail system from delivering test messages.

Since the steps shown in FIG. 5 introduce test messages into some message batches that the receiving gateway component retrieves from the receiving incoming message store, the facility also contains steps effective to prevent the gateway software 308 of the receiving mail system from delivering test messages as if they were normal messages. FIG. 6 shows the steps performed by the facility in order to prevent the receiving mail system from delivering test messages. The steps shown in FIG. 6 are preferably performed by the receiving gateway component periodically, and aborted if no messages have been stored in the incoming message transfer store. The steps may alternatively be performed each time the other gateway component stores messages in the incoming message transfer store, if this activity information is available to the receiving gateway component. In step 601, the facility retrieves the bundle of messages stored in the receiving gateway component's incoming message transfer store. It should be noted that the successful retrieval of messages (either normal messages or test messages) is indicative of the fact that the other gateway component has recently operated properly. In steps 602–605, the facility loops through each of the retrieved messages. Step 602 marks the beginning of the loop, and step 605 the end. (These "loop limit" symbols are discussed on page 6 of ANSI/ISO 5807–1985, a standard for, among other things, symbols and conventions for program flowcharts promulgated by the International Standards Organization and adopted by the American National Standards Institute.) In step 603, if the current retrieved message is a test message, then the facility continues at step 605, else the current retrieved message is a normal message and the facility continues in step 604 to deliver is in the usual manner. In step 605, the facility deletes the retrieved message so that it does not continue to be stored in the incoming message store, thereby preventing the other gateway component from storing its next bundle of messages in the message store. In step 606, the facility loops to the next retrieved message. After the last retrieved message is processed, these steps conclude.

While this invention has been shown and described with reference to preferred embodiments, it will be understood by those skilled in the art that various changes or modifications in form and detail may be made without departing from the scope of the invention. For example, the facility may be implemented in gateways that connect more than two mail systems to detect the failure of any number of gateway components. Further, the facility may be implemented in any mechanism for passing messages between two mail systems, such as a bridge or a relay.

We claim:

1. A method in a computer mail gateway for diagnosing the failure of the gateway, the gateway being for forwarding messages from a first mail system to a second mail system via a message transfer store, the gateway comprising the message transfer store, a first gateway component for transferring messages from the first mail system to the message transfer store, and a second gateway component for retrieving messages from the message transfer store for forwarding to the second mail system, the method comprising the steps of:

transmitting a dummy message from the first gateway component to the message transfer store, said dummy message being transmitted to decide whether the second gateway component has failed;

under the control of the first gateway component, detecting that the dummy message from the first gateway component has remained in the message transfer store for at least a predetermined time; and in response to the detecting step, determining that the gateway has failed.

2. The method of claim 3, further including the step of, in response to the determining step and under the control of the first gateway component, transmitting a diagnostic message to a computer mail user of the: first computer mail system indicating the failure of the gateway.

a diagnosis subsystem for diagnosing the failure of the connected

3. The method of claim 1 wherein the detecting step includes the steps of:

initiating transmission of a second message from the first gateway component to the message transfer store; and detecting that the initiated transmission of the second message was not completed, whereby the failure of the second gateway component is diagnosed.

4. The method of claim 3 wherein the second message is a dummy message transmitted into the gateway for the purpose of determining whether the second gateway component has failed.

5. The method of claim 4, further including the step of periodically transmitting dummy messages into the gateway for the purpose of determining whether the second gateway component has failed.

6. The method of claim 4, wherein the gateway being for forwarding primary messages and dummy messages, further including the step of transmitting dummy messages into the gateway when no primary messages are being transmitted into the gateway for the purpose of determining whether the second gateway component has failed.

7. In a compound computer mail system comprised of a first mail system, a second mail system, and a gateway for passing messages between the first mail system and the second mail system, the gateway including a message transfer store for storing messages, the second mail system including a retrieval gateway component for retrieving messages from the message transfer store, a method for testing a status of the gateway, comprising the steps of:

transmitting a test message addressed to the second mail system, where the test message is stored in the message transfer store until the retrieval gateway component retrieves the test message;

after a predetermined period of time has expired, determining whether the test message remains stored in the message transfer store;

when it is determined that the test message has not remained stored in the message transfer store, generating an indication at the gateway that the gateway is operating properly; and when it is determined that the test message has remained stored in the message store, generating an indication at the gateway that the gateway is not operating properly.

8. The method of claim 7, further including the steps of, when it is determined that the test message has not remained stored in the message transfer store, determining that the test message was received in the second mail system and discarding the test message without delivering the test message to a computer mail user.

9. The method of claim 7, further including the steps of, when it determined that the test message has not remained stored in the message transfer store, determining that the test message was not received in the second mail system and providing at the gateway to a user of the first mail system an indication that the gateway is not operating properly.

10. A method in a compound computer mail system comprised of a first mail system, a second mail system, and a gateway connecting the first mail system and the second mail system, the method for using testing messages to detect a failure of the gateway and comprising the steps of:

transmitting a test message addressed to the second mail system; and detecting the failure of the gateway based on whether the test message remains at the gateway for longer than a predetermined period of time.

11. A computer mail system for diagnosing the failure of a connected computer mail system, the connected computer mail system processing messages transmitted to it by the computer mail system when the connected computer mail system has not failed, comprising:

a message transmission subsystem for transmitting a message to the connected computer mail system, a message storage for storing the message transmitted by the message transmission subsystem until retrieved by the connected computer mail system;

a message processing timer for determining a period of time during which the message remains stored in the message storage;

a diagnosis subsystem for diagnosing the failure of the connected computer mail system when the message processing timer indicates that the message remained stored in the message storage for a predetermined period of time; and a dummy interval memory for storing a time interval at which the scheduler periodically causes the message transmission subsystem to transmit dummy messages to the connected mail system.

12. The computer mail system of claim 11, further including a scheduler for causing the message transmission subsystem to periodically transmit dummy messages to the connected mail system.

13. The computer mail system of claim 11, further including a failure reporting subsystem for causing the message transmission subsystem to transmit a message to a user of the mail system indicating that the connected computer mail system has failed if the diagnosis subsystem diagnoses the failure of the connected computer mail system.

14. A computer mail gateway for passing messages between a first mail system and a second mail system and capable of diagnosing its own failure, comprising:

a message transfer store for storing messages being passed between the first mail systems and the second mail system;

a gateway component for causing messages sent from the first mail system to the second mail system, to be stored in the message transfer store and causing messages sent from the second mail system to the first mail system to be retrieved from the message transfer store; and a failure diagnosis subsystem for determining whether the gateway has failed, comprising:

a monitoring stage for monitoring a length of time each message remains in the message transfer store;

a dummy message generator for generating dummy messages that are transmitted to the message transfer store to determine whether the gateway has failed;

a verification stage for verifying whether each message remains in the message transfer store for more than a predetermined period of time; and a result stage for generating an indication that the gateway has failed when the monitoring stage indicates a message remained in the message transfer store for longer than a predetermined period of time, whereby the failure diagnosis subsystem determines the gateway has failed.

15. The computer mail gateway of claim 14, further including a failure reporting subsystem for receiving an indication that the gateway has failed from the failure diagnosis subsystem and transmitting a message indicating that the gateway has failed to a user of one of the mail systems.

16. A computer-readable medium holding instructions for performing a method in a computer mail gateway for diagnosing the failure of the gateway, the gateway being for forwarding messages from a first mail system to a second mail system via a message transfer store, the gateway comprising the message transfer store, a first gateway component for transferring messages from the first mail system to the message transfer store, and a second gateway component for retrieving messages from the message transfer store for forwarding to the second mail system, the method comprising the steps of:

transmitting a dummy message from the first gateway component to the message transfer store, said dummy message being transmitted to decide whether the second gateway component has failed;

under the control of the first gateway component, detecting that the dummy message from the first gateway component has remained in the message transfer store for at least a predetermined time; and in response to the detecting step, determining that the gateway has failed.

17. The computer-readable medium of claim 16 wherein the method further comprises the step of, in response to the diagnosing step and under the control of the first gateway component, transmitting a diagnostic message to a computer mail user of the first computer mail system indicating the failure of the gateway.

18. The computer-readable medium of claim 16 wherein the detecting step includes the steps of:

initiating transmission of a second message from the first gateway component to the message transfer store; and detecting that the initiated transmission of the second message was not completed, whereby the failure of the second gateway component is diagnosed.

19. The computer-readable medium of claim 18 wherein the second message is a dummy message transmitted into the gateway for the purpose of determining whether the second gateway component has failed.

20. The computer-readable medium of claim 19 wherein the method further comprises the step of periodically transmitting dummy messages into the gateway for the purpose of determining whether the second gateway component has failed.

21. The computer-readable medium of claim 20 wherein the gateway being for forwarding primary messages and dummy messages, further including the step of transmitting dummy messages into the gateway when no primary messages are being transmitted into the gateway for the purpose of determining whether the second gateway component has failed.

22. In a compound computer mail system comprised of a first mail system, a second mail system, and a gateway for passing messages between the first mail system and the second mail system, the gateway including a message transfer store for storing messages, the second mail system including a retrieval gateway component for retrieving messages from the message transfer store, a computer-readable medium holding instructions for performing a method for testing a status of the gateway, comprising the steps of:

transmitting a test message addressed to the second mail system, where the test message is stored in the message transfer store until the retrieval gateway component retrieves the test message;

after a predetermined period of time has expired, determining whether the test message remains stored in the message transfer store;

when it is determined that the test message has not remained stored in the message transfer store, generating an indication at the gateway that the gateway is operating properly; and when it is determined that the test message has remained stored in the message store, generating an indication at the gateway that the gateway is not operating properly.

23. The computer-readable medium of claim 22 wherein the method further comprises the steps of, when it is determined that the test message has not remained stored in the message transfer store, determining that the test message was received in the second mail system and discarding the test message without delivering the test message to a computer mail user.

24. The computer-readable medium of claim 22 wherein the method further comprises the steps of, when it determined that the test message has not remained stored in the message transfer store, determining that the test message was not received in the second mail system and providing at the gateway to a user of the first mail system an indication that the gateway is not operating properly.

25. A computer-readable medium holding instructions for performing a method in a compound computer mail system comprised of a first mail system, a second mail system, and a gateway connecting the first mail system and the second mail system, the method for using testing messages to detect a failure of the gateway and comprising the steps of:

transmitting a test message addressed to the second mail system; and detecting the failure of the gateway based on whether the test message remains at the gateway for longer than a predetermined period of time.

* * * * *